(12) United States Patent
Huang et al.

(10) Patent No.: US 8,483,340 B2
(45) Date of Patent: Jul. 9, 2013

(54) DEVICE AND METHOD FOR RECEIVER-EQUALIZER CALIBRATION

(75) Inventors: Liang-Wei Huang, HsinChu (TW);
Mei-Chao Yeh, HsinChu (TW);
Chien-Sheng Lee, HsinChu (TW);
Li-Han Liang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 228 days.

(21) Appl. No.: 13/157,971

(22) Filed: Jun. 10, 2011

(65) Prior Publication Data

US 2011/0305269 A1  Dec. 15, 2011

(30) Foreign Application Priority Data

Jun. 11, 2010  (TW) .............................. 99119033 A

(51) Int. Cl.
*H04B 1/10* (2006.01)
(52) U.S. Cl.
USPC .......................................... 375/350; 375/229
(58) Field of Classification Search
USPC ......................................... 375/229–234, 350
See application file for complete search history.

(56) References Cited

U.S. PATENT DOCUMENTS

| | | | |
|---|---|---|---|
| 5,600,500 A * | 2/1997 | Madsen et al. ................... | 360/46 |
| 5,991,339 A * | 11/1999 | Bazes et al. ..................... | 375/232 |
| 6,604,221 B1 * | 8/2003 | Ueno ............................ | 714/771 |
| 7,446,622 B2 * | 11/2008 | Chiang .......................... | 333/18 |
| 7,496,161 B2 * | 2/2009 | Chou et al. ..................... | 375/344 |
| 8,050,317 B2 * | 11/2011 | Okamura et al. ................ | 375/229 |
| 2002/0181573 A1 * | 12/2002 | Dohmen et al. ................. | 375/229 |
| 2005/0052255 A1 * | 3/2005 | Chiang .......................... | 333/18 |
| 2006/0008279 A1 * | 1/2006 | Chiang et al. .................. | 398/202 |
| 2007/0109950 A1 * | 5/2007 | He ............................. | 369/124.11 |
| 2007/0133671 A1 * | 6/2007 | Tsai ............................ | 375/233 |
| 2008/0141105 A1 * | 6/2008 | Fujita ........................... | 714/807 |
| 2009/0162068 A1 * | 6/2009 | Wada et al. ..................... | 398/81 |
| 2010/0027606 A1 * | 2/2010 | Dai et al. ...................... | 375/232 |
| 2010/0219996 A1 * | 9/2010 | Abel et al. ..................... | 341/120 |
| 2012/0076033 A1 * | 3/2012 | Mundarath et al. .............. | 370/252 |

* cited by examiner

*Primary Examiner* — Emmanuel Bayard
(74) *Attorney, Agent, or Firm* — Muncy, Geissler, Olds & Lowe, PLLC

(57) ABSTRACT

The disclosure is a device and a method for receiver-equalizer calibration, in which the device includes an adaptive filter, a Clock Data Recovery (CDR) unit, an adaptive control unit and a run length encoding unit. The adaptive filter receives a channel signal, calibrates the channel signal according to a filter control signal and compensates the channel signal to obtain a compensative signal. The CDR unit receives the compensative signal to generate a sampling clock signal, a data signal and a transition sampling signal. The run length encoding unit receives the data signal and run-length encodes the data signal to generate first code data and second code data. The adaptive control unit receives the first code data, the second code data, the data signal and the transition sampling signal, and performs weight calculation to adjust the filter control signal.

14 Claims, 5 Drawing Sheets

DEVICE AND METHOD FOR RECEIVER-EQUALIZER CALIBRATION

CROSS-REFERENCES TO RELATED APPLICATIONS

This non-provisional application claims priority under 35 U.S.C. §119(a) on Patent Application No. 99119033 filed in Taiwan, R.O.C. on 2010 Jun. 11, the entire contents of which are hereby incorporated by reference.

BACKGROUND OF THE INVENTION

1. Technical Field

The disclosure relates to a receiver device, and more particularly to a device and a method for calibrating a receiver equalizer.

2. Related Art

FIG. 1 is architecture of an ordinary communication system, which includes a transmitter 101, a channel 102 and a receiver equalizer 103. The receiver equalizer 103 includes an adaptive filter 110, a Clock Data Recovery (CDR) unit 120 and an adaptive controller 130. Here, it should be noted that persons of ordinary skill in the art shall understand that the operation of the above elements belongs to the prior art, and for brevity, detailed operations of the elements will not be described here.

The receiver equalizer 103 in the prior art adjusts a filter control signal G of the adaptive filter 110 by determining whether channel attenuation is over-compensated (over EQ), or under-compensated (under EQ), during data transition, and compensates a channel signal VR according to the filter control signal G. In practice, several problems may be encountered in the prior art.

1. When the input channel signal of the receiver equalizer 103 is 01010101, 001100110011, 000111000111, 0000111100001111 or 00000111110000011111 etc, that is, the binary sequence contains successive low-order binary bits (low-order representing 0), and successive high-order binary bits (high-order representing 1), and the number of the low-order binary bits is equal to that of the high-order binary bits, the data has desirable distinguishability, and it is better not to adjust the filter control signal G. However, in the case of repeated transition of data of the same length, the prior art still continuously adjusts the filter control signal G. In this way, in the case of repeated transition of data of the same length, when channel attenuation is over-compensated a more serious over EQ phenomenon may occur to a compensative signal X if the adaptive filter 110 is adjusted repeatedly; conversely, when channel attenuation is under-compensated, a serious under EQ phenomenon may occur to the compensative signal X if the adaptive filter 110 is adjusted repeatedly.

2. When the compensative signal X obtained by the adaptive filter 110 compensating the channel signal VR is under-compensated, the filter control signal G of the adaptive filter 110 must be quickly adjusted to enhance the compensation for the channel signal VR. When the compensative signal X obtained by the adaptive filter 110 compensating the channel signal VR is over-compensated, the filter control signal G of the adaptive filter 110 must be adjusted quickly to reduce the compensation for the channel signal VR. The prior art can only gradually adjust the compensation effect, but cannot quickly and properly adjust the filter compensation effect of the receiver equalizer, resulting in reduced system efficiency.

SUMMARY

In view of the above problems of the prior art, the disclosure provides a device for receiver-equalizer calibration. The device for receiver-equalizer calibration uses a run length technique to generate run length data, and an adaptive control unit uses the run length data, performs weight calculation and quickly obtains optimal adjustment parameters, so as to control an adaptive filter unit to achieve a better filter compensation effect.

An objective of the disclosure is to provide a device for receiver-equalizer calibration, which includes an adaptive filter, a CDR unit, a run length encoding unit and an adaptive control unit. The adaptive filter is used for receiving a channel signal, calibrating the channel signal according to a filter control signal and compensating the channel signal to obtain a compensative signal. The CDR unit is connected to the adaptive filter, and used for receiving the compensative signal to generate a sampling clock signal, a data signal and a transition sampling signal. The run length encoding unit is connected to the CDR unit, and used for encoding the data signal into first code data and second code data. The adaptive control unit is connected to the CDR unit and the run length encoding unit, and used for receiving the first code data, the second code data, the data signal and the transition sampling signal and performing weight calculation to adjust the filter control signal.

Another objective of the disclosure is to provide a method for receiver-equalizer calibration, which includes: inputting a channel signal to an adaptive filter, calibrating the channel signal according to a filter control signal and compensating the channel signal to obtain a compensative signal; processing the compensative signal to generate a sampling clock signal, a transition sampling signal and a data signal; run-length encoding the data signal to generate first code data and second code data; and performing weight calculation according to the first code data, the second code data, the transition sampling signal and the data signal to adjust the filter control signal.

In order to make these and other objectives, features, and advantages of the disclosure comprehensible, preferred embodiments accompanied with figures are described in detail below.

BRIEF DESCRIPTION OF THE DRAWINGS

The present invention will become more fully understood from the detailed description given herein below for illustration only, and thus not limitative of the present invention, wherein.

DETAILED DESCRIPTION

The disclosure uses a run length technique to generate run length data, and an adaptive control unit uses the run length data, performs weight calculation and obtains optimal adjustment parameters, so as to control an adaptive filter unit to achieve a better filter compensation effect.

Two embodiments of a device for receiver-equalizer calibration of a communication system are described below respectively.

Figure 1:
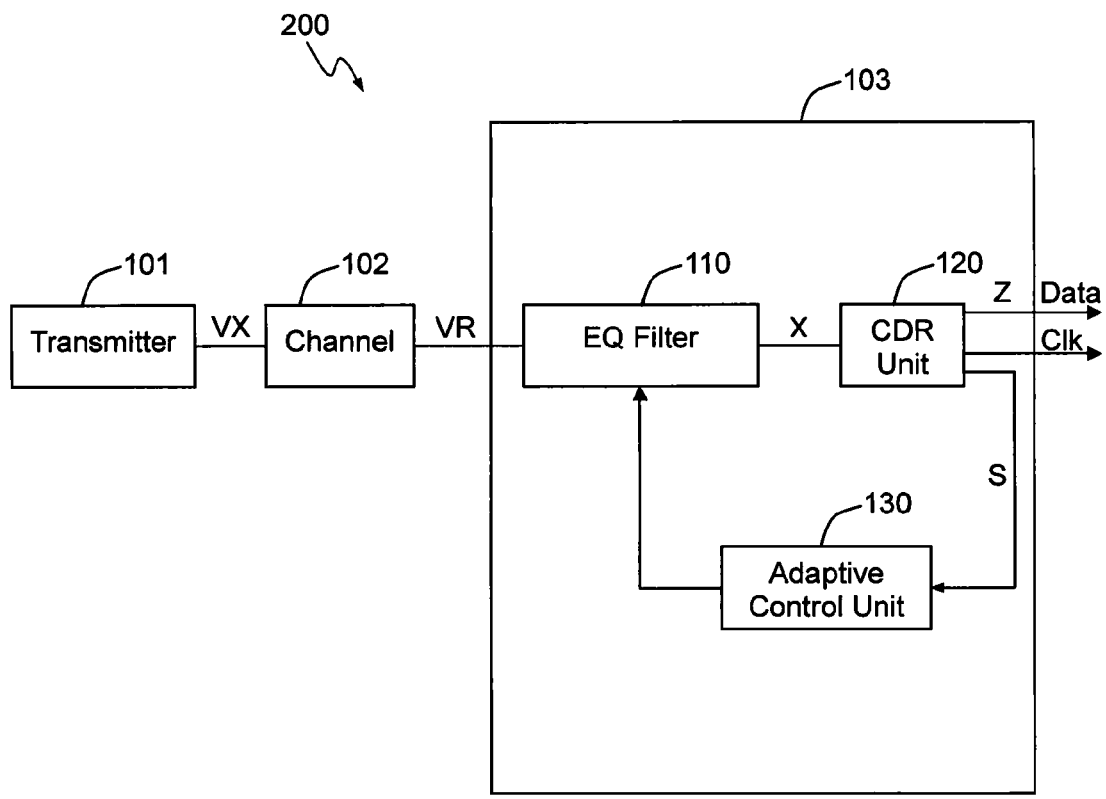
FIG. 1 is a functional block diagram of a communication system in the prior art.
Figure 2:
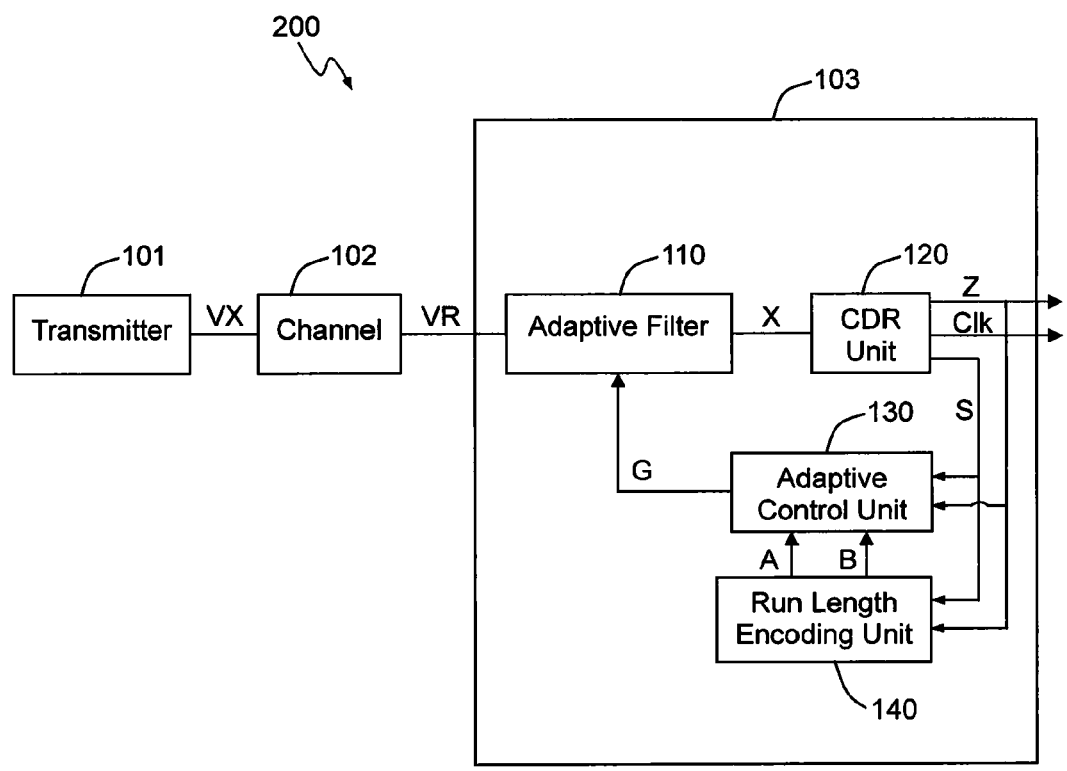
FIG. 2 is a first embodiment of a device for receiver-equalizer calibration of a communication system.

FIG. 2 is a first embodiment of a device for receiver-equalizer calibration of a communication system according to the disclosure. The device for receiver-equalizer calibration 103 of the communication system 200 includes an adaptive filter 110, a CDR unit 120, an adaptive control unit 130 and a run length encoding unit 140. A transmitter 101 transfers a signal VX, and after passing through a channel 102, the transferred signal may become a channel signal VR due to distortion caused by interference of the channel 102. The adaptive filter 110 receives the channel signal VR, calibrates the channel signal VR according to a filter control signal G and compensates the channel signal VR to obtain a compensative signal X. The CDR unit 120 is connected to the adaptive filter 110, and used for receiving the compensative signal X to generate a sampling clock signal CLK, a data signal Z and a transition sampling signal S. The run length encoding unit 140 is connected to the CDR unit 120, and used for encoding the data signal Z into first code data a (for example, the number of successive 0 bits), and second code data "b" (for example, the number of successive 1 bits). The adaptive control unit 130 is connected to the adaptive filter 110, the CDR unit 120 and the run length encoding unit 140, and used for receiving the first code data a, the second code data b, the data signal Z and the transition sampling signal S and performing weight calculation to adjust the filter control signal G. The adaptive filter 110 compensates the channel signal VR to generate the compensative signal X, and high and low frequency ranges of attenuation or amplification are determined by the filter control signal G, so as to compensate the waveform.

In practice, it is found that the prior art may improperly handle the case of repeated transition of data of the same length of the input data signal 01010101, 001100110011, 000111000111, 0000111100001111, or 00000111110000011111, etc, which can be completely solved by the disclosure. Therefore, for the length of run length of successive low-order binary bits and successive high-order binary bits before and after data transition of a signal [a b], the run length [a b] of the input data signal is [1 1], [2 2], [3 3], [4 4], or [5 5], . . . . For other different input data signals, a≠b, and the encoding result may be [1 2], [2 1], [1 3], [3 1], [2 3], [3 2], [1 4], [4 1], [2 4], [4 2], [3 4], [4 3], [1 5], or [5 1], etc. In practice, the larger an absolute value of the first code data "a" minus the second code data "b" (abs(a−b)) is, the better the filter compensation effect of the adaptive control unit 130 adjusting the adaptive filter 110 will be. When the absolute value of the first code data "a" minus the second code data "b" is zero (abs(a−b)=0), the data has desirable distinguishability, and the adaptive control unit 130 should not adjust the adaptive filter 110.

Figure 3:
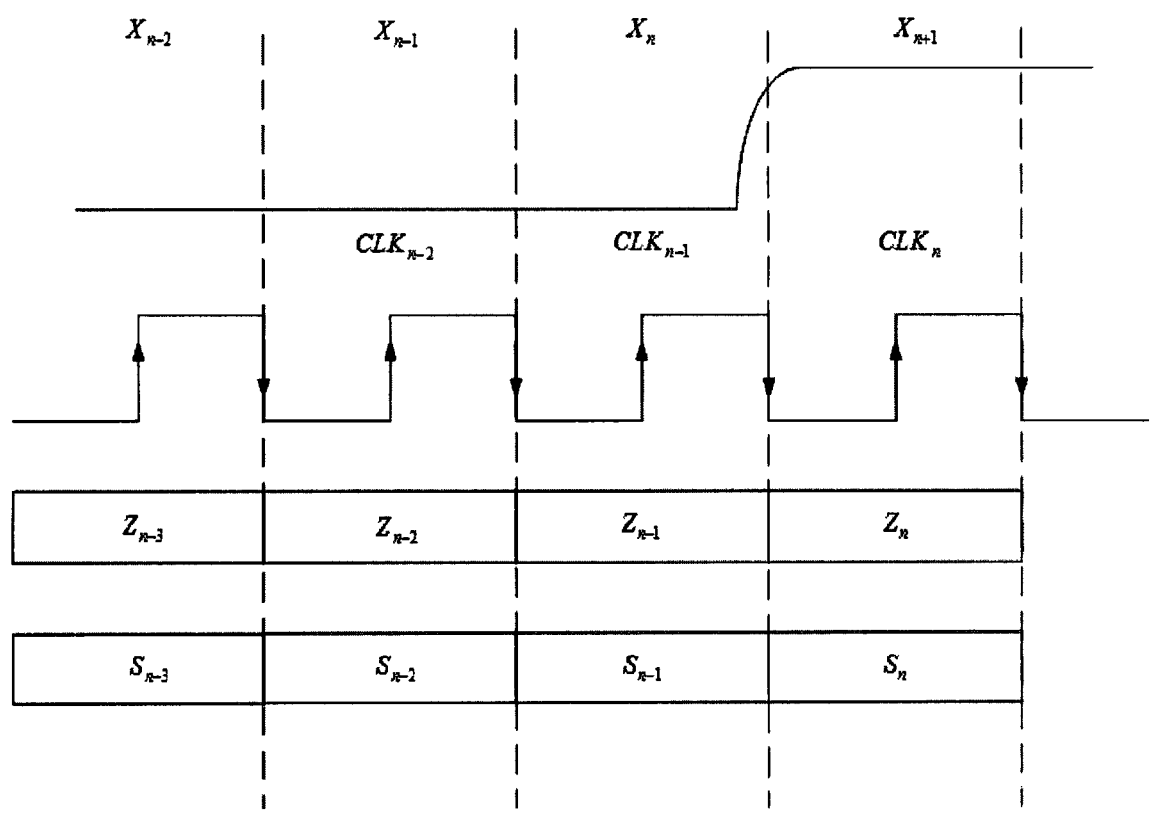
FIG. 3 is a timing chart of a data signal and a transition sampling signal.

The receiver equalizer may be categorized into an Adaptive Feed-forward Equalizer (FFE) and an Adaptive Feedback Equalizer (FBE), and the disclosure takes the FFE as an example to illustrate the application of the disclosure. Referring to FIG. 3, if the input of the CDR unit 120 is a compensative signal $X_n$, the output is a sampling clock signal $CLK^n$, a transition sampling signal $S_n$ and a data signal $Z_n$. The transition sampling signal $S_n$ is a signal obtained by sampling the compensative signal $X_n$ at a negative edge of the sampling clock signal $CLK_{n-1}$; and $S_{n-1}$ represents a signal obtained by sampling the compensative signal $X_{n-1}$ at a negative edge of the sampling clock signal $CLK_{n-2}$. At this time, the data signal $Z_n$ is a signal obtained by sampling the compensative signal $X_n$ at a positive edge of the clock signal $CLK_{n-1}$ and sampling again at a negative edge of the sampling clock signal $CLK_{n-1}$; and $Z_{n-1}$ represents a signal obtained by sampling the compensative signal $X_{n-1}$ at a positive edge of the sampling clock signal $CLK_{n-2}$ and sampling again at a negative edge of the sampling clock signal $CLK_{n-2}$.

Here, $G_n$ represents a gain of the current filter control signal, and $G_{n+1}$ represents a gain of a next filter control signal; and Δ represents a step gain, and is a gain for adjusting the filter control signal G each time. Taking the adaptive control unit of the FFE as an example, a method for adjusting the filter control signal G in the prior art is as follows:

if $Z_n=Z_{n-1}$ Condition 1 is satisfied, $$G_{n+1}=G_n \quad \text{Formula 1}$$

Else if $S_{n-1}=Z_{n-2}$ Condition 2 is satisfied, that is, the situation is under EQ, $$G_{n+1}=G_n+\Delta \quad \text{Formula 2}$$

else Condition 3 is satisfied, that is, the situation is over EQ, $$G_{n+1}=G_n-\Delta \quad \text{Formula 3}$$

The method for adjusting the filter control signal G by the adaptive control unit of the FFE of the disclosure is to calculate a value of the filter control signal G by using a run length as a weight, and the following is a first embodiment:

if $Z_n=Z_{n-1}$ Condition 4 is satisfied, $$G_{n+1}=G_n \quad \text{Formula 4}$$

Else if $S_{n-1}=Z_{n-2}$ Condition 5 is satisfied, that is, the situation is under EQ, $$G_{n+1}=G_n+\text{abs}(a-b)*\Delta \quad \text{Formula 5}$$

Else Condition 6 is satisfied, that is, the situation is over EQ, $$G_{n+1}=G_n-\text{abs}(a-b)*\Delta \quad \text{Formula 6}$$

Example 1: it is assumed that the data signal (011 011111011) is input to the run length encoding unit 140, and the run length encoding unit 140 uses a run length to encode the data signal, in which the number of successive 0 bits after the $4^{th}$ bit is 1, that is, the first code data "a" is 1, and the number of successive 1 bits after the $5^{th}$ bit is 5, that is, the second code data "b" is 5. At this time, if $S_{n-1}=Z_{n-2}$ is satisfied, Condition 5 is satisfied, and the adaptive control unit 130 uses Formula 5 to calculate ($G_{n+1}=G_n+\text{abs}(a-b)*\Delta$). The result of $G_{n+1}=G_n+\text{abs}(1-5)*\Delta$ is sent to the adaptive filter 110, and the gain of the filter control signal of the adaptive filter 110 is increased by 4Δ. When the difference between the first code data "a" and the second code data "b" is large, the adaptive control unit 130 significantly adjusts a filter compensation factor of the adaptive filter 110, so that quick adjustment can be achieved.

The method for adjusting the filter control signal G by the adaptive control unit of the FFE of the disclosure is to calculate a value of the filter control signal G by using a run length as a weight, and the following is a second embodiment, which additionally provides the difference between the first code data "a" and the second code data "b" when the two are equal to assist determining under EQ or over EQ:

if $(Z_n=Z_{n-1})$ or (a=b) Condition 7 is satisfied, $$G_{n+1}=G_n \quad \text{Formula 7}$$

Else if $[(a-b>0) \& (S_{n-1}=Z_{n-1})]$ or $[(a-b<0) \& (S_{n-1}=Z_n)]$ Condition 8 is satisfied, $$G_{n+1}=G_n+\text{abs}(a-b)*\Delta \quad \text{Formula 8}$$

Else if $[(a-b<0) \& (S_{n-1}=Z_{n-1})]$ or $[(a-b>0) \& (S_{n-1}=Z_n)]$ Condition 9 is satisfied, $$G_{n+1}=G_n-\text{abs}(a-b)*\Delta \quad \text{Formula 9}$$

Here, Condition 8 is under EQ; and Condition 9 is over EQ.

Example 1: it is assumed that the data signal (011 000011110100), is input to the run length encoding unit 140, and the run length encoding unit 140 uses a run length to encode the data signal, in which the number of successive 0 bits after the $4^{th}$ bit is 4, that is, the first code data "a" is 4, and the number of successive 1 bits after the $8^{th}$ bit is 4, that is, the second code data "b" is 4. At this time, since Condition 7, that the first code data "a" is equal to the second code data "b" (a=b), is satisfied, the filter control signal of the adaptive control unit 130 is $G_{n+1}=G_n$ (Formula 7). That is, the gain of the filter control signal G remains unchanged, and the $G_{n+1}$ is sent to the adaptive filter 110; therefore, the signal filter compensation factor of the adaptive filter 110 will not be compensated.

Example 2: it is assumed that the data signal (011 011111011), is input to the run length encoding unit 140, and the run length encoding unit 140 uses a run length to encode the data signal, in which the number of successive 0 bits after the $4^{th}$ bit is 1, that is, the first code data "a" is 1, and the number of successive 1 bits after the $5^{th}$ bit is 5, that is, the second code data "b" is 5. At this time, the first code data "a" is not equal to the second code data "b" (a # b), and a−b<0, and if $S_{n-1}=Z_n$ is satisfied, Condition 8 is satisfied, and the adaptive control unit 130 uses Formula 8 to calculate ($G_{n+1}=G_n+$ abs(a−b)*Δ). The result of $G_{n+1}=G_n+$abs(1−5)*Δ is sent to the adaptive filter 110, and the gain of the filter control signal of the adaptive filter 110 is increased by 4Δ. When the difference between the first code data "a" and the second code data "b" is large, the adaptive control unit 130 significantly adjusts the filter compensation factor of the adaptive filter 110, so that quick adjustment can be achieved.

Figure 4:
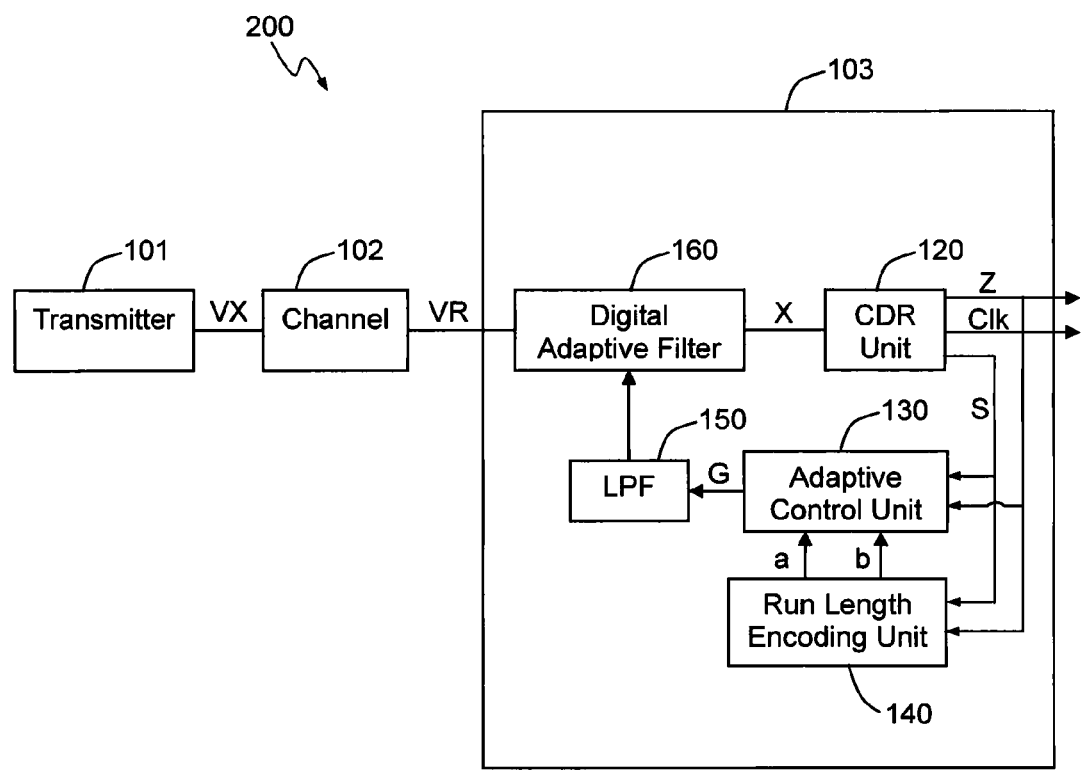
FIG. 4 is a second embodiment of a device for receiver-equalizer calibration of a communication system.

The architecture of the receiver equalizer of FIG. 2 in the disclosure is an ordinary analog equalizer. The disclosure can also be applied to design a digital receiver equalizer. FIG. 4 is a second embodiment of a device for receiver-equalizer calibration of a communication system, which is an embodiment of a digital receiver equalizer. The device for receiver-equalizer calibration 103 of the communication system includes a CDR unit 120, an adaptive control unit 130, a run length encoding unit 140, a low-pass filter 150 and a digital adaptive filter 160. A transmitter 101 transfers a signal, and after passing through a channel 102, the transferred signal may become a channel signal VR due to distortion caused by interference of the channel 102. The digital adaptive filter 160 receives the channel signal, calibrates the channel signal according to a filter control signal G and compensates the channel signal to obtain a compensative signal X. The CDR unit 120 is connected to the digital adaptive filter 160, and used for receiving the compensative signal to generate a sampling clock signal CLK, a data signal Z and a transition sampling signal S. The run length encoding unit 140 is connected to the CDR unit 120, and used for receiving and run-length encoding the data signal to generate first code data a (for example, the number of successive 0 bits), and second code data "b" (for example, the number of successive 1 bits). The adaptive control unit 130 is connected to the CDR unit 120 and the run length encoding unit 140, and used for receiving the first code data a, the second code data b, the data signal Z and the transition sampling signal S and performing weight calculation to generate the filter control signal G to the low-pass filter 150. The low-pass filter 150 filters out high frequency noises of the filter control signal G and generates a value of a fixed filter tap number, and the value of the fixed filter tap number is used for controlling the filter tap number of the digital adaptive filter 160. The filter tap number of the digital adaptive filter 160 represents a filter compensation factor, and the digital adaptive filter 160 uses the filter compensation factor to compensate the channel signal VR resulting from channel interference.

It should be noted that the difference between the embodiments of FIG. 4 and FIG. 2 lies mainly in the fact that an analog filter is used in FIG. 2 while a digital filter is used in FIG. 4. The adjustment action and adjustment formula of the adaptive control unit 130 and the run length encoding unit 140 can also use Formula 4, Formula 5 and Formula 6 for adjustment. The difference lies in the fact that Δ is set to different values for the analog filter and the digital filter.

Figure 5:
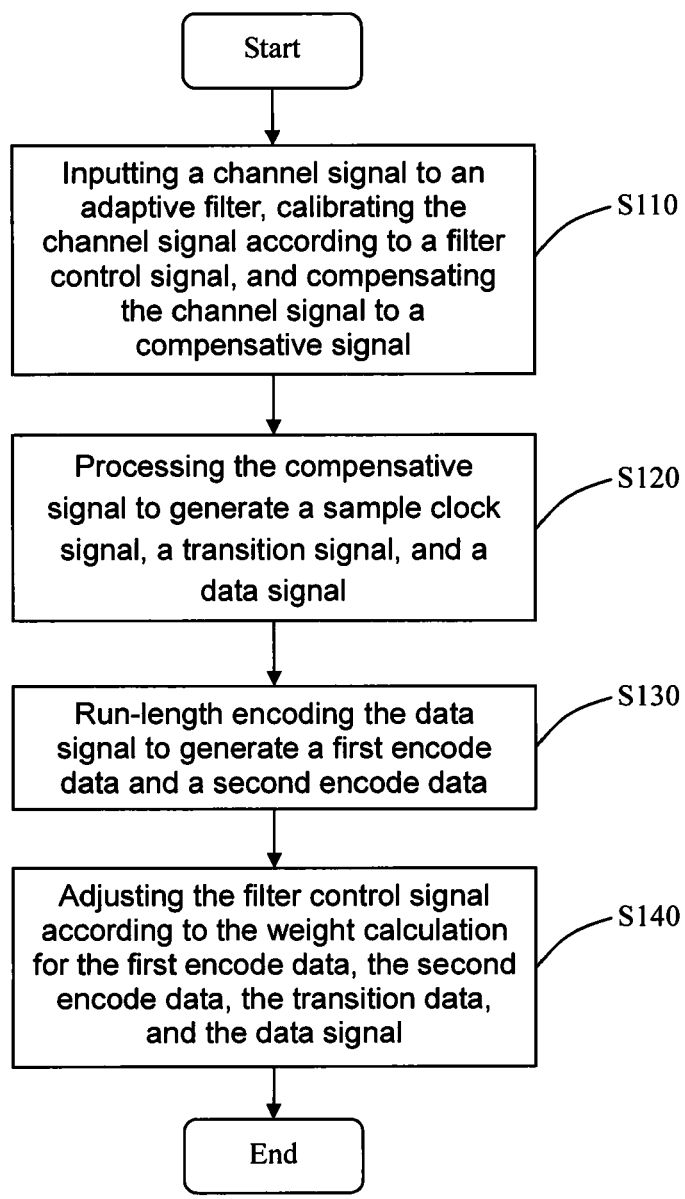
FIG. 5 is a flow chart of a method for receiver-equalizer calibration.

Next, FIG. 5 is a flow chart of a method for receiver-equalizer calibration according to the disclosure, which includes the following steps.

In Step S110, a channel signal is input to an adaptive filter, the channel signal is calibrated according to a filter control signal and the channel signal is compensated to obtain a compensative signal.

In Step S120, the compensative signal is processed to generate a sampling clock signal, a transition sampling signal and a data signal.

In Step S130, the data signal is run-length encoded to generate first code data and second code data.

In Step S140, weight calculation is performed according to the first code data, the second code data, the transition sampling signal and the data signal to adjust the filter control signal.

The run length is to use a combinational logic encoder to run-length encode the data signal to generate the first code data and the second code data. The filter control signal uses the first code data, the second code data, the transition sampling signal, and the data signal, and performs weight calculation to generate optimal compensation parameters.

While the present invention has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A device for receiver-equalizer calibration, comprising:
   an adaptive filter, for receiving a channel signal, calibrating the channel signal according to a filter control signal and compensating the channel signal to obtain a compensative signal;
   a Clock Data Recovery (CDR) unit, coupled to the adaptive filter, for receiving the compensative signal to generate a sampling clock signal, a data signal and a transition sampling signal;
   a run length encoding unit, coupled to the CDR unit, for run-length encoding the data signal to generate a first code data and a second code data; and
   an adaptive control unit, coupled to the adaptive filter, the CDR unit and the run length encoding unit, for receiving the first code data, the second code data, the data signal and the transition sampling signal and performing weight calculation to adjust the filter control signal.

2. The device for receiver-equalizer calibration according to claim 1, wherein the first code data is a number of successive low-order binary bits, and the second code data is a number of successive high-order binary bits.

3. The device for receiver-equalizer calibration according to claim 2, wherein the weight calculation performed by the adaptive control unit uses an absolute value of a difference between the first code data and the second code data as a weight to adjust the filter control signal.

4. The device for receiver-equalizer calibration according to claim 2, wherein when an absolute value of a difference between the first code data and the second code data is substantially zero, and the compensative signal is that channel attenuation is over-compensated or under-compensated, the adaptive control unit does not adjust the filter control signal.

5. The device for receiver-equalizer calibration according to claim 2, wherein the larger an absolute value of a difference between the first code data and the second code data is, the larger an amount of adjustment by which the adaptive control unit adjusts the filter control signal is.

6. The device for receiver-equalizer calibration according to claim 2, wherein the weight calculation performed by the adaptive control unit uses a difference between the first code data and the second code data to determine whether the compensative signal is that channel attenuation is over-compensated or under-compensated, and using an absolute value of the difference between the first code data and the second code data as a weight to generate the filter control signal.

7. The device for receiver-equalizer calibration according to claim 1, further comprising a low-pass filter, coupled between the adaptive filter and the adaptive control unit.

8. A method for receiver-equalizer calibration, comprising:
    inputting a channel signal to an adaptive filter, calibrating the channel signal according to a filter control signal and compensating the channel signal to obtain a compensative signal;
    processing the compensative signal to generate a sampling clock signal, a transition sampling signal and a data signal;
    run-length encoding the data signal to generate first code data and second code data; and
    performing weight calculation according to the first code data, the second code data, the transition sampling signal and the data signal to adjust the filter control signal.

9. The method for receiver-equalizer calibration according to claim 8, further comprising:
    encoding a number of successive low-order binary bits into the first code data, and
    encoding a number of successive high-order binary bits into the second code data.

10. The method for receiver-equalizer calibration according to claim 9, wherein the step of performing the weight calculation uses an absolute value of a difference between the first code data and the second code data as a weight to adjust the filter control signal.

11. The method for receiver-equalizer calibration according to claim 9, wherein in the step of performing the weight calculation, when an absolute value of a difference between the first code data and the second code data is substantially zero, and the compensative signal is that channel attenuation is over-compensated or under-compensated, the adaptive control unit does not adjust the filter control signal.

12. The method for receiver-equalizer calibration according to claim 9, wherein in the step of performing the weight calculation, the larger an absolute value of a difference between the first code data and the second code data is, the larger an amount of adjustment by which the adaptive control unit adjusts the filter control signal is.

13. The method for receiver-equalizer calibration according to claim 9, wherein the step of performing the weight calculation uses a difference between the first code data and the second code data to determine whether the compensative signal indicates that channel attenuation is over-compensated or under-compensated, and uses an absolute value of the difference between the first code data and the second code data as a weight to adjust the filter control signal.

14. The method for receiver-equalizer calibration according to claim 8, further comprising:
    performing low-pass filtering on the filter control signal.

* * * * *